United States Patent [19]

Pöckl

[11] Patent Number: 4,856,701
[45] Date of Patent: Aug. 15, 1989

[54] DEVICE FOR POSITIONING TENTERING FRAMES INTO ASSOCIATION WITH A WORKPIECE WHICH IS BEING ASSEMBLED ALONG A TRANSFER LINE

[75] Inventor: Franz Pöckl, Augsburg, Fed. Rep. of Germany

[73] Assignee: Kuka, Fed. Rep. of Germany

[21] Appl. No.: 207,335

[22] Filed: Jun. 14, 1988

[30] Foreign Application Priority Data

Jun. 16, 1987 [DE] Fed. Rep. of Germany ....... 3720175

[51] Int. Cl.$^4$ ............................................. B23K 37/04
[52] U.S. Cl. ....................................... 228/6.1; 228/47; 228/49.1; 219/79; 29/771; 29/787; 29/822
[58] Field of Search .................. 228/4.1, 6.1, 47, 49.1, 228/DIG. 1; 29/771, 787, 822; 219/79, 80, 771, 787

[56] References Cited

U.S. PATENT DOCUMENTS

| | | | |
|---|---|---|---|
| 4,589,184 | 5/1986 | Asano et al. | 29/430 |
| 4,589,199 | 5/1986 | Ohtaki et al. | 29/430 |
| 4,682,722 | 7/1987 | Bossotto et al. | 228/4.1 |
| 4,738,387 | 4/1988 | Jaufmann et al. | 228/4.1 |

FOREIGN PATENT DOCUMENTS 2126174 2/1984 United Kingdom ......... 228/DIG. 1

Primary Examiner—Nicholas P. Godici
Assistant Examiner—Samuel M. Heinrich
Attorney, Agent, or Firm—McGlew & Tuttle

[57] ABSTRACT

A device for positioning tentering frames into association with a workpiece which is being assembled along a transfer line which has a working station includes a movable guiding section which extends substantially perpendicular to the transfer line at the working station on each side of the transfer line at the working station on each side of the transfer line. The movable guiding section includes a sliding platform which is movable therealong on each side of the transfer line and which has a portion facing the assembly line with means for engaging respective tentering frames. At least two guide members or guidings are arranged on each side of the transfer line and in spaced relationship to each other so that they extend substantially parallel to the transfer line. Each guiding carries at least three tentering frames which are movable therealong into association with the platforms. The platforms are movable between working positions close to the transfer line and to a withdrawn position remote from the transfer line.

8 Claims, 3 Drawing Sheets

DEVICE FOR POSITIONING TENTERING FRAMES INTO ASSOCIATION WITH A WORKPIECE WHICH IS BEING ASSEMBLED ALONG A TRANSFER LINE

FIELD AND BACKGROUND OF THE INVENTION

The invention relates in general to assembly systems and in particular to a new and useful device for the automatic conveyance of tentering frames between a waiting station, especially for the welding of loosely joined automobile carriage parts, the tentering frames being displaceable parallel to a workpiece transfer line on guiding rails, extending cross-wise to the transfer line and out of a sliding position into a working position.

Such tentering frames are used especially in the mass production of automobile carriages. The frames hold provisionally joined construction groups of the raw carriage, for example bottom-, roof-, or side pieces or parts which are supplied along the transfer line and centered, so that an automatic welding of the entire carriage can be carried out. Through German patent No. 28 10 822 it is known, to assemble two different construction types of raw carriages in one common transfer line and to weld them. For this purpose there is for each construction type a corresponding set of tentering frames which are brought into a working position by means of a programmed control. A set of tentering frames, which are not in use for the moment thus have to go into a waiting position, so that they cannot hinder each other during the displacing movements.

In the case of this prior art the waiting positions are situated in front of and behind the working position, in relation to a direction which is parallel to the transfer line.

However, in the modern mass production of working pieces, especially of automobile carriages it is supposed, that more than two types of working pieces can be treated in one transfer line. The German patent No. 28 10 822 deals with this requirement insofar, as it provides a magazine of several tentering frames for different types of work pieces and as it provides conveying devices for the working stations for the fetching and bringing back of the suitable tentering frames. Of course such a measure requires a lot of controlling- and operating expense and as a consequence a high need of space.

In the case of the prior art it is possible as well to provide further waiting stations apart from the waiting station, in order to place there two tentering frames for different working piece types. However, such a measure enlarges the need in space for the entire device for treating the work pieces, and thus show substantial disadvantages.

It is known from the German patent mentioned, to dispose three tentering frames for different construction types in the area of a working station at both sides of the transfer line. This measure, however, supposes first, that the upper edges of the tentering frames are disposed twistable at a rotating body, the axis of which is disposed parallel to the transfer line and extends far above the work piece to be treated. The lower edges of the tentering frames are held in linear guidings and thus can be put up against the work piece to be treated by a pivoting movement of the guidings. Such a measure necessitates a considerable need in space above the transfer line as well as a rugged scaffolding construction for the guiding of the tentering frames.

SUMMARY OF THE INVENTION

The invention provides a device, which is further developed so that more than two tentering frames can be used for treating at least three types of work pieces, without requiring more space along the transfer line or above. According to the invention, in both waiting stations at both sides of the transfer line at least two respective guiding sections comprising at least three tentering frames, for different types of work pieces are disposed parallel to each other and stationary and in that in the working station at each side of the transfer line one guiding section for taking the tentering frame is guided displaceable cross-wise, i.e. perpendicular to the transfer line and can be positioned in aligned positions with the guiding sections.

The movable guiding section which is displaceable perpendicularly to the transfer line and being arranged parallel to the transfer can accommodate any of the tentering frames when in the respective aligned position with the stationary guiding sections. For example: a first tentering frame on the displaceable guiding section can be moved in a direction parallel with the transfer line onto the aligned stationary guiding section; and a second tentering frame on the opposing section of the stationary guiding section can be moved onto the displaceable guiding section. By this means any tentering frame in a waiting position can be put into a working position by first moving it onto the displaceable guiding section and then moving it cross-wise to the transfer line into the working position.

By means of this inventive arrangement it is obtained that the length of the working installation is not bigger than in the case of the subject matter of the German patent No. 28 10 822 construction and a substantially smaller height of the construction is possible over that disclosed in the case of German patent No. 34 14 387. The needs in space are bigger solely in the width of the inventive subject matter, that is by the size of the respective second guiding section. On this level, however, there is no problem with regard to the enlargement of the basal working surface.

The subject matter of the invention offers beyond this a considerable advantage concerning the automatic control of the movement operations of the tentering frames. That is the displaceable section of the guiding section requires only that the section be moved into the alignment of one or the other guiding section for the tentering frames situated in the waiting stations, in order to bring the necessary tentering frame into the position ready for work, and in order to place the tentering frame, which has been worked on before, into a waiting position.

Besides the invention offers the possibility to move the tentering frame, which is situated in the displaceable guiding section, into the working position as well as into an intermediate position, and it is provided that the working pieces are driven forward in cadence when the displaceable guiding section is situated in the intermediate position.

Further embodiments of the invention are shown in the figures and in the specification. It is suitable, if the displaceable guiding section is fashioned as a gantry formed construction and is disposed at the edge of a sliding platform facing the working position. This sliding platform can take at least one industrial robot, preferably two of them, for the treatment of the work piece to be treated. As a result in the case of a lateral movement of the sliding platform not only the individual tentering frames, which are guided in them, but the industrial robot as well, which is placed on it are moved out of the movement path of the work piece to be treated, so that the work piece can be supplied in timed sequence to the next working station.

In order to spare driving devices, the invention provides, that the tentering frames provide coupling parts at their narrow sides, which can engage automatically with a tentering frame in a waiting position if there is a cross-wise movement of the tentering frame disposed in the displaceable guiding section. Therefore solely one tentering frame has to be driven for a lateral sliding movement, because the adjacent tentering frame can be dragged by means of coupling elements.

Accordingly, it is an object of he invention is to provide a device for positioning tentering frames into association with a workpiece which is movable along a transfer line which has a working station and which comprises a movable guiding section extending substantially perpendicular to the transfer line at the working station on each side of the transfer line, and including a sliding platform which is movable along the guiding station on each side of the transfer line and has a portion facing the transfer line with means for engaging a respective tentering frame, at least two guidings being arranged in spaced apart locations parallel to the transfer line, each having at least three tentering frames associated with the at least two guidings which are movable along the stations thereon, the platforms being movable between a working position which is close to the transfer line and a withdrawn position which is remote from the transfer line.

A further object of the invention is to provide a device for positioning tentering frames in association with a tranfer line which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
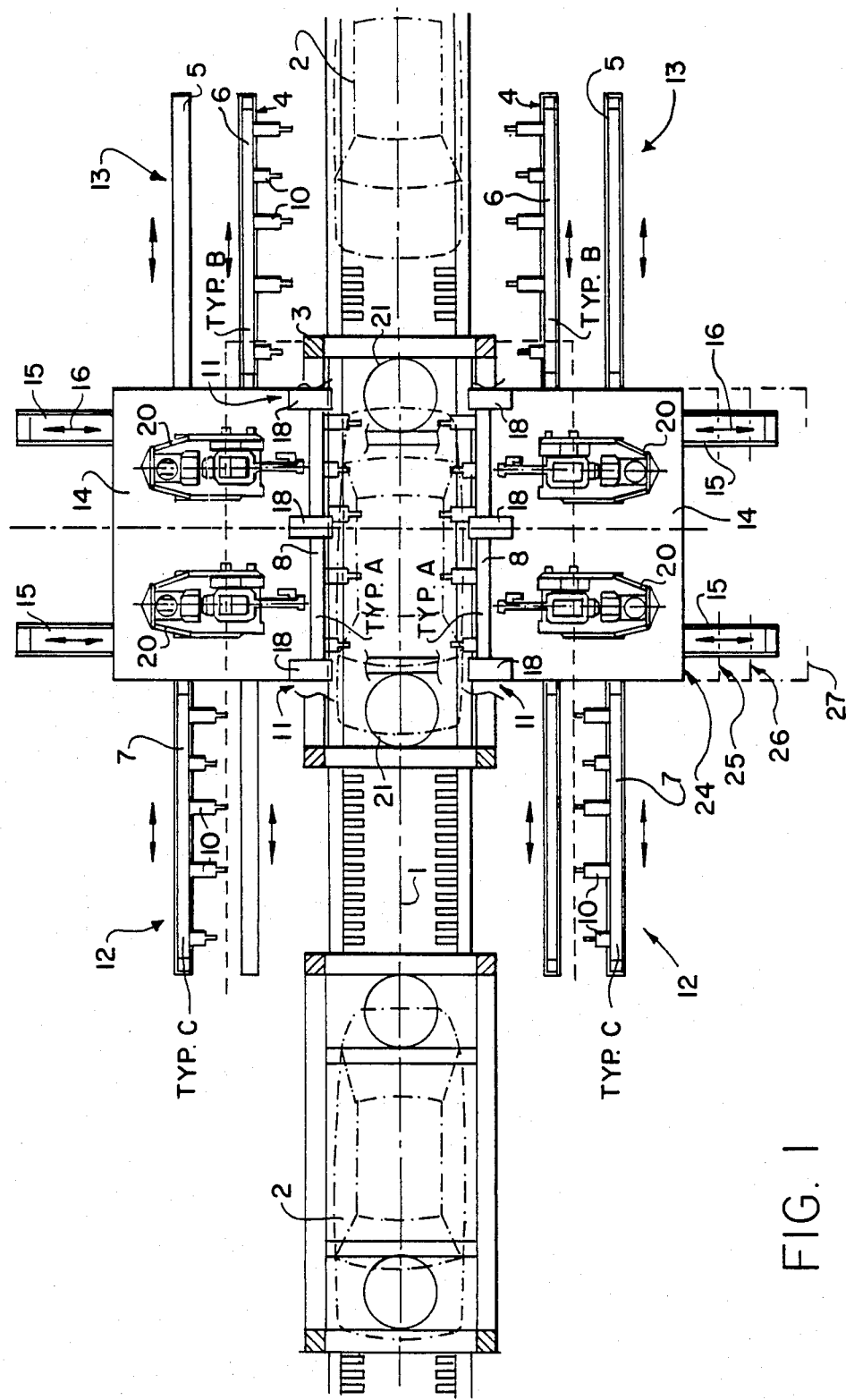
FIG. 1 is a top plan view of a working station of an assembly line with waiting stations for mobile guided tentering frames next to it constructed in accordance with the invention.

Referring to the drawings in particular, the invention embodied therein includes a device for positioning tentering frames such as tentering frames 6, 7 and 8 into association with a workpiece 2 which is being assembled along a transfer line or assembly line 1. In accordance with the invention, a movable guiding section 11 which extends substantially perpendicular to the transfer line is arranged on each side of the transfer line at a working station 3. The transfer guiding section 11 includes a sliding platform 14 movable along the guiding section on each side of the transfer line 1. The sliding platform 14 has a portion facing the transfer line with means for engaging respective tentering frames 6 or 7 or 8. The construction includes at least two guidings or rails 4 and 5 arranged at spaced parallel locations on each side of the transfer line 1. The tentering frames 6, 7 and 8 are constructed so that they move along either one of the guidings 4 and 5 between stations thereon and each may be associated with the movable platform or sliding platform 14. The platform 14 is movable between a working position in which it is close to the transfer line 1 as indicated at 24 and in which various workpiece parts may be assembled to a workpiece 2 out to an opposite end position which is remote from the transfer line and designated 27 as shown in FIG. 1.

In the example of embodiment of FIG. 1 a transfer line or assembly 1 is represented, along which work pieces (2), for example parts of automobile carriages, are advanced in timed relationship or in cadence. In a work station (3) the individual parts of the workpieces (2) are clamped in a centered position and are to be welded together. In the embodiment shown industrial robots 20 and additional hanging industrial robots are provided for the welding process.

According to the invention along the transfer line (1) more than two different workpiece part types are treated. To each individual workpiece part a tentering frame 6 or 7 or 8 is assigned and which are arranged on each side of the transfer line. The control of the installation is constructed in such a way, that for the respective workpiece (2) situated in that work station (3) the respective tentering frame 6 or 7 or 8 is guided towards the workpiece.

In the embodiment of FIG. (1) three tentering frames 6, 7 and 8 are represented on each side of the transfer line (1) for the treatment of three workpiece part types. The tentering frame (8) is shown in a working position (24) for the treatment of the assigned work piece (2). The respective two other tentering frames 6 and 7 are situated in parallel guidings 4 and 5, which extend along the transfer line (1). These guidings 4 and 5 form the waiting stations (12 and 13).

Figure 2:
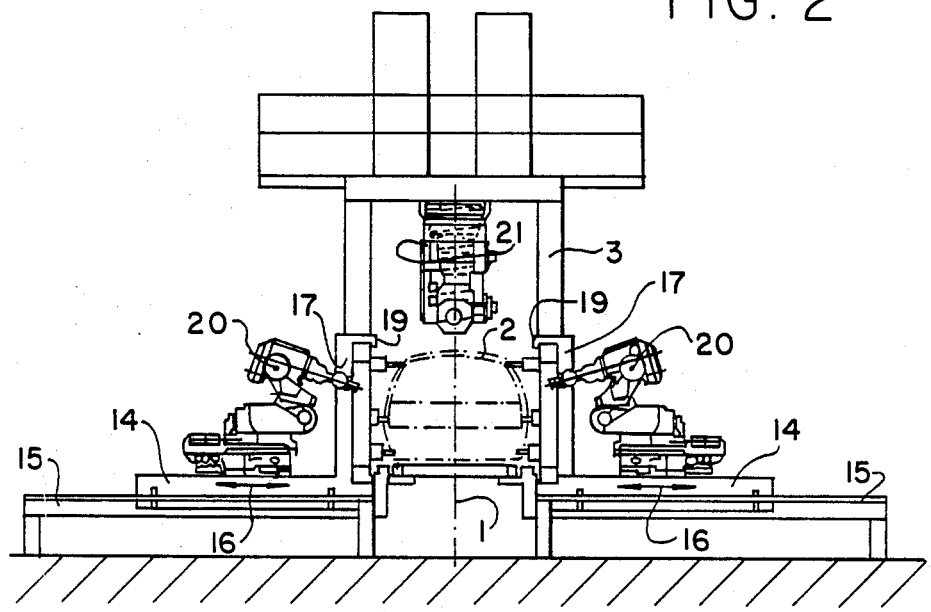
FIG. 2 shows a front elevational view of the working station according to FIG. 1.
Figure 3:
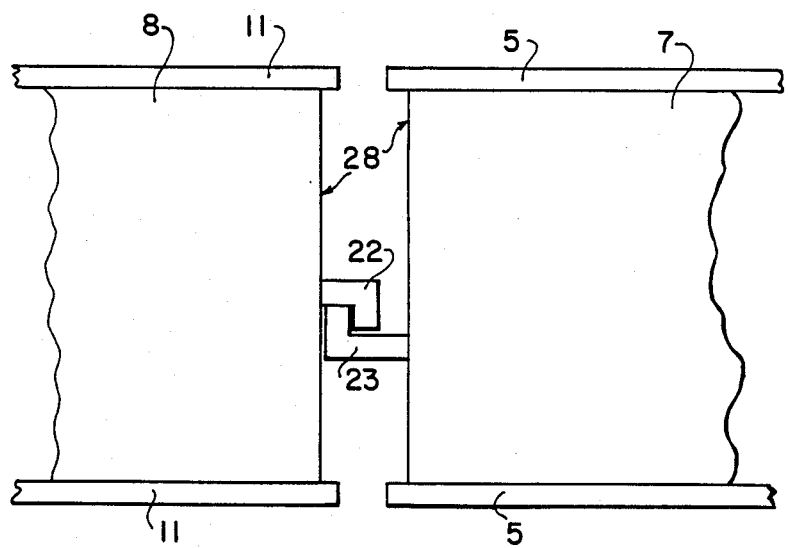
FIG. 3 is a partial lateral view of two tentering frames, which can be coupled together.
Figure 4:
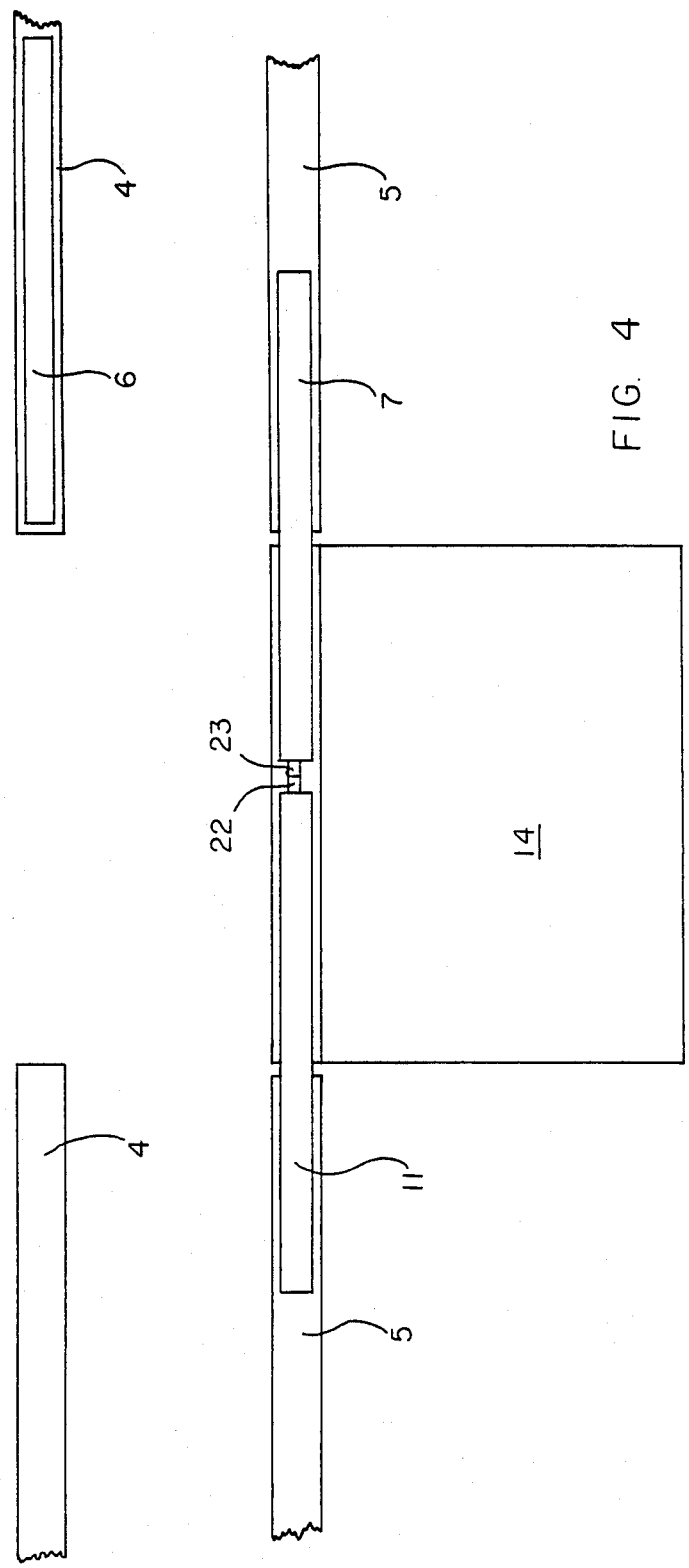
FIG. 4 is a schematic partial top plan view showing a movable guiding section in alignment with a stationary guiding section, and two coupled tentering frames changing their respective positions from the movable to the stationary guiding section and vice versa.

The cited guidings (4 and 5) are interrupted in the area of the working station (3). In this area one mobile guiding section is provided for each side of the transfer line, the guiding section being slidable cross-wise to the transfer line (1) in the directions of the double arrow (16). A mobile guiding section (11) is constructed as a gantry 17 (FIG. 2) having a sliding platform (14), which is movable on rails (15). This mobile guiding section (11) can move the tentering frame (8), against the workpiece (2), so that chucking elements (10), disposed at each tentering frame (6, 7 and 8) are able to take up a part of the workpiece (2), which is assigned and to center it and to clamp it tightly.

In the clamped position of the part of the workpiece (2), the industrial robots (20 and 21) come into action and weld the parts of the workpiece (2) being assembled, for example by means of a working arm of the industrial robot (20), which passes through the hollow spaces of the individual tentering frame (8).

As soon as the treatment or assembly of the part to the workpiece (2) is finished, the sliding platform (14) with the mobile guiding section (11) is moved back into an intermediate position (25), which gives freedom of movement to the workpiece (2), which is then moved along the transfer line (1) into the next work position.

If another tentering frame (6 or 7) has to be used for treating a work piece (2), the sliding platform (14) is brought with the mobile guiding section (11) into the position, which is aligned to one of the two guidings (4 and 5), from where the needed tentering frame (6 or 7) is pulled out along the assigned guiding (4 and 5) and at the same time the tentering frame (8), which has been used before, is brought into the free position of the guiding (4, 5).

In order to effect this movement with a low need of energy, the invention provides in fig. (3), that adjacent front sides (28) of the tentering frames (6, 7 and 8) provide coupling elements (22 and 23) These coupling elements (22 and 23) are fashioned in such a way, that they can engage each other without a problem, when the sliding platform (14) with the tentering frame (8) arranged in it is brought into alignment with one of the guidings (4 or 5). It is recommendable to dispose a drive for the sliding movement of these tentering frames (6, 7, 8). This drive is reversible in the direction of its rotation and is able to move two tentering frames at a time respectively.

In the example of FIG. (2) the construction in the shape of a gentry (17) includes guiding elements 19 arranged on three guiding pillars (18). These guiding pillars (18) are disposed at the edge of the sliding platform facing the transfer line (1).

In the example shown in FIG. (1) different positions (24, 25, 26, 27) of the sliding platform (14) are represented symbolically. they show, that the sliding platform (14) is able to move a tentering frame such as tentering frame (8), which is disposed in it, into working position (24), or an intermediate position (25), or into a guiding position (26 or 27), aligned with the guidings 4 and 5 and to move the one or the other tentering frame (6, 7, or 8) out of the waiting position (12, or 13) and into a working position (24), without the need of very much space.

Industrial robots 20, 21 are disposed in suspended positions so that they can treat the workpiece (2) from above.

While specific embodiments of the invention have been shown and described in detail to illustrate the application of the principles of the invention, it will be understood that the invention may be embodied otherwise without departing from such principles.

What is claimed is:

1. A device for positioning tentering frames into associating with a workpiece, the workpiece being assembled along a transfer line, the transfer line having a working station, comprising:
   a movable guiding section arranged substantially parallel to the transfer line, the guiding section being movable in a direction substantially perpendicular to the transfer line;
   at least one stationary guiding section arranged substantially parallel to the transfer line;
   at least two tentering frames each tentering frame being slidable on said movable guiding section and said stationary guiding section;
   a waiting position defined by said tentering frames being on one of said at least one stationary guiding section;
   a working position defined by one of said tentering frames being on said movable guiding section and said movable guiding section being close to said transfer line;
   said movable guiding section being alignable with each of said at least one stationary guiding section defining at least one aligning position;
   each of said tentering frames being slidable from said movable guiding section to said stationary guiding section and from said stationary guiding section to said movable guiding section in said at least one aligning position.

2. A device according to claim 1, wherein said movable guiding section can be positioned in an intermediate position between said working position and said waiting position.

3. A device according to claim 1, wherein said movable guiding section is mounted on a movable platform.

4. A device according to claim 3, wherein the movable guiding section is formed as a gantry.

5. A device according to claim 10, wherein said gantry includes at least two vertical guiding pillars disposed on the edge of said movable platform toward the transfer line, at least two guiding elements being arranged on each of said guiding pillars.

6. A device according to claim 3, further comprising at least one industry robot mounted on said platform for treating the workpiece.

7. A device according to claim 1, wherein said tentering frames include narrow sides having coupling parts which can interengage each other thereby effecting corresponding movements of said tentering frames.

8. A device for positioning tentering frames into association with a workpiece which is assembled along a transfer line which has a working station, comprising:
   a movable guiding section arranged substantially parallel to the transfer line, and being movable in a direction substantially perpendicular to the transfer line;
   at least one stationery guiding section arranged substantially parallel to the transfer line;
   at least two tentering frames each beng slidable on said movable guiding section and said stationary guiding section;
   a waiting position defined by said tentering frames being on one of said at least one stationary guiding section;
   a working position defined by one of said tentering frames being on said movable guiding section and said movable guiding section being close to said transfer line;
   said movable guiding section being alignable with each of said at least one stationary guiding section defining at least one aligning position;
   each of said tentering frames being slidable from said movable guiding section to said stationary guiding section and from said stationary guiding section to said movable guiding section in said at least one aligning position;
   each of said tentering frames having coupling parts, said coupling parts being interengageable with each other, thereby effecting corresponding movements of said tentering frames.

* * * * *